United States Patent

Hayashi et al.

[11] Patent Number: 5,997,775
[45] Date of Patent: *Dec. 7, 1999

[54] ELECTRICALLY CONDUCTIVE BARIUM SULFATE-CONTAINING COMPOSITION AND PROCESS OF PRODUCING

[75] Inventors: Takao Hayashi; Norihiro Sato, both of Shimonoseki; Manabu Hosoi, Omiya; Nobuyoshi Kasahara, Sayama, all of Japan; Clemens Aderhold, Krefeld, Germany; Wolf-Dieter Griebler, Moers, Germany; Jörg Hocken, Düsseldorf, Germany; Uwe Rosin, Duisberg, Germany; Günther Rudolph, Neuberg, Germany

[73] Assignee: Mitsui Kinzoku Mitsui Maining & Smelting Co. Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/975,513

[22] Filed: Nov. 21, 1997

Related U.S. Application Data

[63] Continuation of application No. 08/785,798, Jan. 21, 1997, abandoned, which is a continuation of application No. 07/653,304, Feb. 11, 1991, Pat. No. 5,106,319, which is a continuation of application No. 07/705,304, May 24, 1991, abandoned.

[30] Foreign Application Priority Data

May 26, 1990 [DE] Germany .............................. 40 17 044

[51] Int. Cl.$^6$ ................................ H01B 1/00; H01B 1/08
[52] U.S. Cl. .................................... 252/518.1; 252/520.1; 252/520.21; 428/403; 428/918; 106/286.4; 106/461
[58] Field of Search .................. 423/554; 252/518.1, 252/520.1, 520.21; 428/403, 918; 106/286.4, 461

[56] References Cited

U.S. PATENT DOCUMENTS

| | | | |
|---|---|---|---|
| 4,373,013 | 2/1983 | Yashizumi | 106/441 |
| 4,657,835 | 4/1987 | Yashiki | 430/60 |
| 5,236,737 | 8/1993 | Linton | 427/126.3 |
| 5,585,037 | 12/1996 | Linton | 232/518 |
| 5,628,932 | 5/1997 | Linton | 106/415 |
| 5,688,841 | 11/1997 | Parish | 523/216 |
| 5,716,553 | 2/1998 | Bergmann et al. | 252/518 |
| 5,834,549 | 11/1998 | Suezaki et al. | 524/409 |

FOREIGN PATENT DOCUMENTS

| | | | |
|---|---|---|---|
| 61157438 | 12/1981 | Japan | 423/554 |
| 407310034 | 11/1995 | Japan . | |
| 408134383 | 5/1996 | Japan . | |

OTHER PUBLICATIONS

Ichinomiya et al. "White Electrically Conductive Coating Cpd. and White Electrically Conductive Film Comprising Same" JA–62–181371 (Jan. 30, 1988).

Yoshizumi, "Preparation of Conductive Composite Powder", (Mar. 12, 1982) JA 55–59620 Japanese Abstracts.

*Primary Examiner*—Paul Marcantoni
*Attorney, Agent, or Firm*—Michael J. Striker

[57] ABSTRACT

The electrically conductive, barium sulfate-containing composition consists of $BaSO_4$ particles having a surface area of from 0.1 to 150 m$^2$/g. The $BaSO_4$ particles each are provided with a $SnO_2$ coating having a thickness of 2 to 80 nm and containing from 1 to 15% by weight of the $Sb_2O_3$. The electrically conductive, barium sulfate-containing composition is made by a method including the steps of adding a first acidic solution containing 1 to 95% by weight $SnCl_4$ and a basic solution to an aqueous dispersion from 50 to 800 g/l of $BaSO_4$ to make a basic mixture having a pH from 9 to 15; then adding an acid to the basic mixture to form an acidic mixture having a pH from 4 to 1; then adding a second acid solution containing 0.5 to 60% by weight of $SbCl_3$ to the acidic mixture; separating the electrically conductive, barium sulfate-containing composition from the acidic mixture; and drying and igniting the separated electrically conductive, barium sulfate-containing composition at 300 to 800° C.

3 Claims, No Drawings

5,997,775

ELECTRICALLY CONDUCTIVE BARIUM SULFATE-CONTAINING COMPOSITION AND PROCESS OF PRODUCING

This application is a continuation of application Ser. No. 08/785,798, filed Jan. 21, 1997, now abandoned, which in turn is a continuation of application, Ser. No. 07/653,304, filed on Feb. 11, 1991, now U.S. Pat. No. 5,106,319, which in turn is a continuation of application Ser. No. 07/705,304, filed May 24, 1991, now abandoned.

BACKGROUND OF THE INVENTION

This invention relates to electrically conductive barium sulfate-containing compositions, to the use of the electrically conductive compositions, and to a process of producing them.

In some applications of plastics, their electrical insulating propoerties give rise to technical problems. The electrical insulating properties of plastics are particularly undesirable, for instance, when electronic components must be shielded from relatively large electromanetic fields, such as is the case with commuter housings, or when electric charges are to be discharged from components. The electrical insulating properties of plastics result in difficulties when high explosives or IC components are to be kept in storage, and in the manufacture of medical rubber articles or carpeting provided with an antistatic finish or in the production of electrically conductive adhesives for metal. It is known that polymers can be rendered electrically conductive by an addition of conductive particles. Such conductive particles may consist of metal or carbon black particles as well as of particles made of semiconducting oxides, such as zinc oxide, or iodides, such as copper iodide. A disadvantage involved in the use of metal or carbon black particles is that the polymers containing the additives have a black color, which is not desired in numerous cases. The use of particles of zinc oxide results in undesired temperature-dependent fluctuations of the electrical conductivity. Because polymers which contain copper iodide have only a low chemical stability, they can be used only for a limited number of applications.

JP-56157438-A describes a process of producing a powder mixture which can be added to plastics in order to render them electrically conductive. In that process a solution which contains $SnCl_4$ and $SbCl_3$ is added to an aqueous dispersion of barium sulfate which has been heated. A precipitation is effected in an acid medium and results in mixed powders consisting of $SnO_2$ powder and $BaSO_4$ powder. But the plastics to which the mixed powders have been added have an electrical conductivity which is thermally unstable. Besides, the mixed powders have a relatively poor dispersibility in plastics so that problems arise in the production of a homogeneous mixture consisting of the mixed powders and plastics.

SUMMARY OF THE INVENTION

For this reason it is an object of the invention to provide an electrically conductive barium sulfate-containing composition which has a thermally stable electrical conductivity and a high dispersibility in plastics. An object underlying the invention resides also in the provision of a process by which the electrically conductive barium containing composition produced with the aid of simple technical means and at a high reaction rate.

The object underlying the invention is accomplished when the electrically conductive barium sulfate-containing composition consists of particles of $BaSO_4$ which are covered by a coating of $SnO_2$ that is doped with $Sb_2O_3$. The content of $Sb_2O_3$ in the coating of $SnO_2$ amounts to from 1 to 15% by weight. The coating has a thickness from 2 to 80 nm. The $BaSO_4$ has a surface area from 0.1 to 150 $m^2/g$. The electrical conductivity of the substance provided by the invention amounts to from $1.2\times10^{-4}$ to $7\times10^{-1}$ $(ohm\times cm)^{-1}$. It has surprisingly been found that the electrically conductive barium sulfate-containing composition in accordance with the invention has a high dispersibility in plastics, particularly in resins. The plastic material to which the electrically conductive barium sulfate-containing composition in accordance with the invention has been added is also distinguish by having a constant electrical conductivity even at fluctuating temperatures so that the plastics to which the electrically conductive barium sulfate in accordance with the invention has been added can be used for a large variety of purposes.

In accordance with a preferred feature of the invention, the content of $Sb_2O_3$ in. the coating amounts to from 6 to 12% by weight. In that case the electrically conductive barium sulfate-containing composition has a relatively high electrical conductivity so that the content of the coating in the electrically conductive barium sulfate-containing composition may be relatively low on a weight basis and, as a result, the cost of the electrically conductive barium sulfate-containing composition is relatively low too.

In accordance with a further preferred feature of the invention the coating has a thickness from 10 to 30 nm. In that case the strength of the bond between the coating consisting of $SnO_2$ doped with $Sb_2O_3$ and the particles of $BaSO_4$ is be relatively high. A coating having a thickness from 10 to 30 nm ensures that the coating will not become detached from the particles of $BaSO_4$ during the incorporation of the electrically conductive barium sulfate-containing composition in a matrix.

In accordance with a further preferred feature of the invention the particles of $BaSO_4$ have a surface area from 0.1 to 150 $m^2/g$. In that case the electrically conductive barium sulfate-containing composition in accordance with the invention is useful in numerous fields.

In accordance with a further feature of the invention the particles of $BaSO_4$ have a surface area from 0.1 to 4 or from 12 to 150 $m^2/g$. In that case the electrically conductive barium sulfate-containing composition will be transparent so that it can desirably be processed together with paints, which will then be electrically conductive whereas the covering power of additional pigments will not adversely be effected.

The object underlying the invention is also accomplished by the provision of a process which serves to produce an electrically conductive barium sulfate-containing composition and wherein a first solution which contains $SnCl_4$ is added to an aqueous dispersion of $BaSO_4$ to provide a mixture and the second solution which contains $SbCl_3$ is added to this mixture and which process is characterized in that an aqueous dispersion which contains $BaSO_4$ in a concentration from 50 to 800 g/l is used, the first acid solution contains $SnCl_4$ in a concentration from 1 to 95% by weight, the second acid solution contains $SbCl_3$ in a concentration from 0.5 to 60% by weight, a basic solution is added together with the first solution to the dispersion of $BaSO_4$ to adjust its pH value to a value from 9 to 15, the pH value of the mixture is decreased to a value between 4 and 1 by an addition of acid before the second solution is added, and the resulting electrically conductive barium sulfate-containing composition is separated, dried and ignited at 300 to 600° C. Aqueous solutions of NaOH or KOH may be used, e.g., as the basic solution. That process will afford the advantage that the particles of $BaSO_4$ are entirely covered by a coating of $SnO_2$ which is doped with $Sb_2O_3$. The process can easily be carried out within a short time and the electrically conductive barium sulfate-containing composition which has been produced by the process has a high dispersibility in plastics.

In accordance with a further feature of the invention a third acid solution which has a pH value from 0 to 3 and contains $SnCl_4$ in a concentration from 1 to 95% by weight is added to the suspension of $BaSO_4$ before the first solution is added and the resulting starting mixture is stirred for 10 to 200 minutes before the first solution is added. This will afford the advantage that the surface of the particles of $BaSO_4$ is etched by the $SnCl_4$ which is contained in the third solution before the first solution is added so that a stronger bond will be formed between the coating of $SnO_2$ which is doped with $Sb_2O_3$ and particles of $BaSO_1$.

In accordance With a further preferred feature of the invention the mixture is stirred for 10 to 200 minutes after the first solution and the basic solution have been added and the pH value of the mixture is subsequently decreased to a value from 4 to 1 by an addition of acid before the second solution is added. This will afford the advantage that the particles of $BaSO_4$ will be entirely covered by a coating of $SnO_2$ before the $SnO_2$ is doped with $Sb_2O_3$. As a result, the $Sb_2O_3$ will be homogeneously distributed in the coating of $SnO_2$.

In accordance with a further preferred feature of the invention the electrically conductive barium sulfate-containing composition is separated, dried and ignited when 1 to 30 hours have passed after the addition of the second solution has been completed. This will result in an electrically conductive barium sulfate-containing composition having a relatively high chemical stability.

In accordance with a further preferred feature of the invention the electrically conductive barium sulfate-containing composition is used in the production of electrically conductive adhesives or electrically conductive paints or electrically conductive plastics or electrically conductive laminated papers or electrically conductive synthetic fibers. The quality of the products can thus be improved.

The subject matter of the invention will be explained more in detail with reference to the following Examples.

EXAMPLE 1

100 g $BaSO_4$ having an average particle diameter of 10 $\mu m$ and a surface area of 0.1 $m^2/g$ are suspended in 400 ml water at a temperature of 70° C. The pH value is subsequently adjusted to 2 by an addition of 1 ml concentrated hydrochloric acid. Thereafter, 500 ml water at a temperature of 70° C. and the third solution consisting of 1 ml $SnCl_4$ and 1 ml concentrated hycrochloric acid are added to the acid dispersion of $BaSO_4$. The resulting starting mixture is stirred for 60 minutes so that it assumes a pH value of 1.5. Thereafter, 800 ml of a 10% solution of NaOH and a first solution consisting of 31 ml $SnCl_4$ dissolved in 100 ml 2-molar hydrocloric acid are added. The mixture is stirred for 30 minutes while its temperature is kept at 70° C. During the next 90 minutes the pH value is decreased to 2.5 by an addition of 110 ml 2-molar hydrochloric acid. Thereafter a second solution consisting of 100 ml 5.3 g $SbCl_3$ in 100 ml 2-molar hydrochloric acid and 170 ml of 10% solution of NaDH are added in drops at the same time. After further 20 hours the electrically conductive barium sulfate is separated and dried. When the electrically conductive barium sulfate-containing composition has been ignited at 600° C. for two hours, it has an electrical conductivity of $1.1 \times 10^{-1}$ (ohm×cm)$^{-1}$.

EXAMPLE 2

100g $BaSO_4$ having an average particle diameter of 100 $\mu m$ and a surface area of 30 $m^2/g$ are suspended in 900 ml distilled water. The third solution consisting of 1 ml SnCl and 1 ml concentrated hydrochloric acid is added to the resulting suspension to adjust its pH value to 1.5. The resulting starting mixture is stirred for 1 hour. There-after, 800 ml of a 10% solution of NaOH and a first solution containing 31 ml $SnCl_4$ dissolved in 100 ml 2-molar hydrochloric acid are added at the same time. The mixture is then stirred for further 30 minutes while its temperature is kept at 70°. During the next 90 minutes the pH value is decreased to 2.5 by an addition of 110 ml 2-molar hydrochloric acid. Thereafter the second solution consisting of 5.3 g $SbCl_3$ in 100 ml 2-molar hydrochloric acid and 170 ml of a 10 solution of NaOH are added in drops at the same time. After further 20 hours, the electrically conductive barium sulfate-containing composition is separated and dried. It has conductivity f $2.3 \times 10^{-4}$ (ohm×cm)$^{-1}$ after having been ignited at 400° C. for two hours and of $1.7 \times 10^2$ (ohm×cm)$^{-1}$ after having been ignited at 600° C. for two hours.

EXAMPLE 3

100 g $BasO_4$ having an average particle diameter of 100$\mu m$ and a surface area of 30 $m^2/g$ are suspended in 900 ml distilled water. 1 ml concentrated hydrochloric acid are added to adjust the pH value to 2. The third solution consisting of 1 ml $SnCl_4$ and 1 ml concentrated hydrochloric acid is then added to provide a starting mixture, which is stirred for 60 minutes to adjust its pH value to 1.5. Thereafter a first solution containing 72 ml $SnCl_4$ dissolved in 150 ml 2-molar hydrochloric acid and 1 liter of a 10% solution of NaOH are added at the same time. The mixture is subsequently stirred for 30 minutes while it is kept at a temperature of 70° C. In the next 90 minutes the pH value is decreased to 2.5 by an addition of 110 ml hydrochloric acid. The second solution consisting of 8 g $SbCl_3$ in 150 ml 2-molar hydrochloric acid and 150 ml of a 10% solution of NaOH are subsequently added in drops at the same time. After further 20 hours the electrically conductive barium sulfate-containing composition is separated and dried. When it has ignited at 600° C. For two hours it has a conductivity of $1.9 \times 10^{-2}$ (ohm–cm)$^{-1}$.

EXAMPLE 4

200 g $BaSO_4$ having can average particle diameter of 0.5 $\mu m$ and a surface area of 4 $m^2/g$ are suspended in 800 ml water. By an addition of 1 ml concentrated hydrochloric acid the pH value is adjusted to 2. The third solution consisting of an acid solution of $SnCl_4$ in a concentration of 50% is then added and the solution is stirred for 1 hour to assume a pH value of 1.5. Thereafter, 1000 ml of a 10% solution of NAOH are added to the starting mixture to initially adjust its pH value to 14. The first solution consisting of 62 ml $SnCl_4$ in 138 ml 2-molar hydrochloric acid is added at the same time whereby the pH value is decreased to 11.5. The mixture is subsequently stirred for 30 minutes while it is kept at a temperature of 70° C. By an addition of 470 ml 2-molar hydrochloric acid during the next 90 minutes the pH value is decreased to 2.5. Thereafter the second solution consisting of 10.6 g $SbCl_3$ in 200 ml 2-molar hydrochloric acid is added. For an adjustment to a pH value of 2.5, a total of 200 ml of a 10% solution of NaOH must be added. After further 20 hours the electrically conductive barium sulfate-containing composition is separated and dried. When it has been ignited at 600° C. for two hours it has a conductivity of $8.0 \times 10^{-3}$ $(\text{ohm} \times \text{cm})^{-1}$.

EXAMPLE 5

This example differs from the preceding Examples 1 to 4 in that the $BaSO_4$ is coated in an acid medium and an increase of the pH value to a value from 9 to 15 by a simultaneous addition of a basic solution together with the $SnCl_4$-containing first acid solution is intentionally omitted.

200 g $BaSO_4$ having an average particle diameter of 0.5 μm and a surface area of 4 m$^2$/g are suspended in 800 ml water. 1 ml concentrated hydrochloric acid is added to the suspension to adjust its pH value to 2.2 ml $SnCl_4$ are subsequently added and the solution is stirred for 1 hour to adjust its pH value to 1.5. The starting mixture is then heated to 70° C. and its pH value is increased only to 2.5 by means of a 10% solution of NaOH. 62 ml $SnCl_4$ dissolved in 2-molar hydrochloric acid and 10.6 g $SbCl_3$ dissolved in 2-molar hydrochloric acid together with 1100 ml of a 10% solution of NaOH are added at the same time within 90 minutes. After further 20 hours the $BaSO_4$ is separated and dried and after having been ignited for two hours at 600° C. It has a conductivity of $2 \times 10^{-7}$ $(\text{ohm} \times \text{cm})^{-1}$. That relatively high resistivity and the results of investigations with a transmission electron microscope prove that $BaSO_4$ cannot be coated in an acid medium but mixed powders consisting of particles of $SnO_2$ doped with $Sb_2O_3$ and of particles of $BaSO_4$ will be obtained in that case.

While the invention has been illustrated and described in examples of an electrically conductive barium sulfate and method of making it, it is not intended to be limited to the details shown in the examples, since various modifications and compositional changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by letters patent is set forth in he appended claims.

We claim:

1. An electrically conductive and transparent barium sulfate-containing composition consisting of a plurality of $BaSO_4$ particles having a surface area of from 12 to 150 m$^2$/g, said $BaSO_4$ particles being entirely covered by a $SnO_2$ coating, said $SnO_2$ being doped with $Sb_2O_3$, said $SnO_2$ coating having a thickness of from 2 to 80 nm and said $SnO_2$ coating containing from 1 to 15% by weight of the $Sb_2O_3$.

2. The electrically conductive and transparent barium sulfate-containing composition as defined in claim 1, wherein said $SnO_2$ coating contains from 6 to 12% by weight of the $Sb_2O_3$.

3. An electrically conductive and transparent barium sulfate-containing composition consisting of a plurality of $BaSO_4$ particles having a surface area of from 12 to 150 m$^2$/g, said $BaSO_4$ particles being entirely covered by a $SnO_2$ coating, said $SnO_2$ coating being doped with $Sb_2O_3$, said $SnO_2$ coating having a thickness of from 10 to 80 nm and said $SnO_2$ coating containing from 6 to 12% by weight of the $Sb_2O_3$.

* * * * *